US007265715B2

(12) United States Patent
Goldberg et al.

(10) Patent No.: US 7,265,715 B2
(45) Date of Patent: Sep. 4, 2007

(54) COMMUNICATIONS DEVICE WITH ADAPTIVE DECODING AND ASSOCIATED METHODS

(75) Inventors: Steven J. Goldberg, Downingtown, PA (US); Alain Charles Louis Briancon, Poolesville, MD (US)

(73) Assignee: InterDigital Technology Corporation, Wilmington, DE (US)

( * ) Notice: Subject to any disclaimer, the term of this patent is extended or adjusted under 35 U.S.C. 154(b) by 7 days.

(21) Appl. No.: 11/373,367

(22) Filed: Mar. 10, 2006

(65) Prior Publication Data

US 2006/0202893 A1    Sep. 14, 2006

Related U.S. Application Data

(63) Continuation-in-part of application No. 11/233,307, filed on Sep. 22, 2005, now Pat. No. 7,123,191.

(60) Provisional application No. 60/660,598, filed on Mar. 11, 2005, provisional application No. 60/639,223, filed on Dec. 23, 2004, provisional application No. 60/621,113, filed on Oct. 22, 2004, provisional application No. 60/620,775, filed on Oct. 20, 2004, provisional application No. 60/620,776, filed on Oct. 20, 2004, provisional application No. 60/620,862, filed on Oct. 20, 2004, provisional application No. 60/615,338, filed on Oct. 1, 2004, provisional application No. 60/615,260, filed on Oct. 1, 2004, provisional application No. 60/612,546, filed on Sep. 23, 2004, provisional application No. 60/612,435, filed on Sep. 23, 2004, provisional application No. 60/612,433, filed on Sep. 23, 2004, provisional application No. 60/612,550, filed on Sep. 23, 2004, provisional application No. 60/612,632, filed on Sep. 23, 2004, provisional application No. 60/612,548, filed on Sep. 23, 2004, provisional application No. 60/612,471, filed on Sep. 23, 2004, provisional application No. 60/612,551, filed on Sep. 23, 2004, provisional application No. 60/612,469, filed on Sep. 23, 2004, provisional application No. 60/612,547, filed on Sep. 23, 2004.

(51) Int. Cl.
*G01S 3/16* (2006.01)
*H01Q 3/00* (2006.01)
(52) U.S. Cl. .................. 342/378; 342/377; 702/190
(58) Field of Classification Search .............. 342/373, 342/377–378, 380, 382–383; 702/190–197, 702/FOR. 164
See application file for complete search history.

(56) References Cited

U.S. PATENT DOCUMENTS 5,959,966 A * 9/1999 Torkkola .................. 370/203

(Continued)

*Primary Examiner*—Thomas H. Tarcza
*Assistant Examiner*—F H Mull
(74) *Attorney, Agent, or Firm*—Allen, Dyer, Doppelt, Milbrath & Gilchrist, P.A.

(57) ABSTRACT

In a communications device operating with a blind signal separation (BSS) processor, an initial mixing matrix is formed based upon the different summations of the source signals received by the antenna array. The initial mixing matrix is evaluated to determine a minimum rank that is necessary for at least one source signal to be useable after having been separated from the initial mixing matrix and decoded. An additional mixing matrix is then formed, and also includes the different summations of the source signals. If the rank of the additional mixing matrix is less than the minimum rank associated with the initial mixing matrix, then the source signals are modified so that the rank of the additional mixing matrix is increased.

38 Claims, 3 Drawing Sheets

U.S. PATENT DOCUMENTS

| | | | |
|---|---|---|---|
| 6,473,036 B2 | 10/2002 | Proctor, Jr. | 342/372 |
| 6,799,170 B2 | 9/2004 | Lee et al. | 706/20 |
| 6,931,362 B2 | 8/2005 | Beadle et al. | 702/190 |
| 7,133,699 B1 * | 11/2006 | Owechko et al. | 455/562.1 |
| 2005/0203981 A1 * | 9/2005 | Sawada et al. | 708/322 |

* cited by examiner

COMMUNICATIONS DEVICE WITH ADAPTIVE DECODING AND ASSOCIATED METHODS

RELATED APPLICATION

This application claims the benefit of U.S. Provisional Application Ser. No. 60/660,598 filed Mar. 11, 2005 and is a continuation-in-part of U.S. patent application Ser. No. 11/233,307 filed Sep. 22, 2005 now U.S. Pat. No. 7,123,191 which claims the benefit of U.S. Provisional Application Ser. Nos. 60/639,223 filed Dec. 23, 2004; 60/621,113 filed Oct. 22, 2004; 60/620,775 filed Oct. 20, 2004; 60/620,776 filed Oct. 20, 2004; 60/620,862 filed Oct. 20, 2004; 60/615,338 filed Oct. 1, 2004; 60/615,260 filed Oct. 1, 2004; 60/612,546 filed Sep. 23, 2004; 60/612,435 filed Sep. 23, 2004; 60/612,433 filed Sep. 23, 2004; 60/612,550 filed Sep. 23, 2004; 60/612,632 filed Sep. 23, 2004; 60/612,548 filed Sep. 23, 2004; 60/612,471 filed Sep. 23, 2004; 60/612,551 filed Sep. 23, 2004; 60/612,469 filed Sep. 23, 2004; and 60/612,547 filed Sep. 23, 2004 the entire contents of which are incorporated herein by reference.

FIELD OF THE INVENTION

The present invention relates to the field of signal processing, and more particularly, to decoding signals in a communications device using blind signal separation techniques.

BACKGROUND OF THE INVENTION

Blind signal separation (BSS) techniques involve recovering source signals from a composite signal, wherein the composite signal includes a mixture of the source signals. The separation is "blind" because it is often performed with limited information about the signals, the sources of the signals, and the effects that the propagation channel has on the signals.

Blind source separation is particularly applicable to cellular and personal wireless communications devices, where many frequency bands have become cluttered with numerous radio frequency emitters, often co-existing in the same spectrum. The problem of co-channel emitters is expected to only worsen in years to come with the development of low power, unlicensed wireless technologies such as Bluetooth and other personal area networks.

Three commonly used blind signal separation techniques are principal component analysis (PCA), independent component analysis (ICA) and singular value decomposition (SVD). PCA involves first and second moment statistics of the source signals, and is used when the signal-to-noise ratios of the source signals are high. Otherwise, ICA is used which involves the third and fourth moment statistics of the source signals. ICA is often preceded by a whitening process which improves the condition number of the mixing matrix. PCA is often the choice for such preprocessing. As an alternative, SVD may be used to separate a source signal from the mixture of source signals based upon their eigenvalues.

While these three are the most often encountered processing means, it should be recognized that there are many variations, combinations, and related means that are all within the scope of the basic processing approach. This includes using processing which is semi-blind, meaning that some knowledge of the signals is exploited to enhance the overall processing.

Regardless of the blind signal separation technique that is applied, an antenna array comprising a plurality of antenna elements is typically used to receive different mixtures of the source signals from the various signal sources. Each antenna element outputs a mixture of the source signals, which is ideally a unique sum of the source signals. The unique sums of signals are used to populate a mixing matrix. The appropriate signal separation technique is then applied to the mixing matrix for separating desired source signals from the mixture of source signals.

In general, the rank of the mixing matrix determines the number of the most significant signals that will be separated, while the rest of the signals are treated as noise. This value therefore needs to be at a minimum inclusive of the signals to be decoded. A possibly higher minimum may be necessary to decrease the noise component so that the signal to noise ratio allows an acceptable decoding error rate.

Typically, the size of the mixing matrix remains fixed based upon a function of the number of antenna elements receiving linearly independent summations of the source signals. When separating and decoding a desired signal from the different summations of the source signals, the size of the mixing matrix may be adequate, over-determined or under-determined. Over-determined means that the mixing matrix is larger than what is necessary for adequately separating and decoding the desired signal. Under-determined means that the mixing matrix is less than what is necessary for adequately separating and decoding the desired signal. Over/under-determination of the mixing matrix has a negative effect on optimizing processing, power drain and communication link attributes for the communications device.

SUMMARY OF THE INVENTION

In view of the foregoing background, it is therefore an object of the present invention to vary the size of a mixing matrix when decoding signals in a communications device to avoid over/under-determination of the mixing matrix.

In addition, the subset of the possible means to create the mixing matrix will be chosen to provide adequate results, taking into account the tradeoffs between such adequacy and the implementation constraints in the processing environment.

This and other objects, features, and advantages in accordance with the present invention are provided by a method for decoding signals in a communications device comprising an antenna array, a transceiver coupled to the antenna array, and a processor coupled to the transceiver. The method comprises receiving source signals at the antenna array, with the antenna array comprising N antenna elements for receiving N different summations of the source signals, and providing the N different summations of the source signals to the transceiver.

The method may further comprise evaluating the N different summations of the source signals in the processor by forming an initial mixing matrix comprising the N different summations of the source signals, the initial mixing matrix having a dimension equal to or less than N, and separating at least one desired source signal from the initial mixing matrix. While the antenna array provides N sums, it is possible that they may not all be linearly independent. As a result, the rank of the mixing would be less than N. The evaluation may further comprise decoding the at least one desired source signal after the separating, and determining a minimum rank of the initial mixing matrix necessary for the at least one source signal to be useable after the decoding.

The method may further comprise forming an additional mixing matrix comprising the N different summations of the source signals. If the rank of the additional mixing matrix is less than the minimum rank associated with the initial mixing matrix, then the source signals are modified so that the rank of the additional mixing matrix is increased.

By increasing the rank of the additional mixing matrix, the decoding of the received signals is adjusted so that processing, power drain and communication link attributes are optimized for the communications device. Preserving electrical power is particularly important when the communications device is operating off of a battery.

The N different summations of the source signals used for the additional mixing matrix may be the same as the N different summations of the source signals used for the initial mixing matrix, except time delayed. Alternatively, the N different summations of the source signals used for the additional mixing matrix may be different than the N different summations of the source signals used for the initial mixing matrix.

The communications device may further comprise a signal splitter between the antenna array and the transceiver. The modifying may comprise splitting the source signals so that the rank of the additional mixing matrix is increased. The signal splitter may be a code despreader and/or in-phase (I) and quadrature (Q) modules between the antenna array and the transceiver. The code despreader and the I and Q modules may be used individually or collectively to increase the rank of the additional mixing matrix so that it is at least equal to the minimum rank associated with the initial mixing matrix.

The code despreader decodes the N different summations of the source signals, with each one of the N different summations including k codes for providing k different summations of the source signals associated therewith. The additional mixing matrix comprises kN different summations of the source signals so that a rank of kN is provided.

The I and Q modules separate each one of the N different summations of the source signals into I and Q component sets. The additional mixing matrix comprises 2N different summations of the source signals so that a rank of 2N is provided.

However, if the rank of the additional mixing matrix is greater than the minimum rank associated with the initial mixing matrix, then the method may further comprise modifying the source signals so that the rank of the additional mixing matrix is decreased. The modifying may comprise not including at least one of the N different summations of the source signals when forming the additional mixing matrix. By decreasing the rank of the additional mixing matrix, the decoding of the received signals is adjusted so that processing, power drain and communication link attributes are also optimized for the communications device.

The method may further comprise determining if the N different summations of the source signals are stationary relative to the communications device. The term stationary implies the defining characteristics of the signals, such as its moments. Such characteristics are often affected by relative motion of the transmit sources and the communications device. The processing for separating desired source signals from the additional mixing matrix may be based on a stationary biased processing such as principal component analysis (PCA) if the source signals are stationary, or non-stationary biased processing such as non-stationary PCA if some subset of the received signals are not stationary.

The type of processing used for separating the at least one desired source signal from the initial mixing matrix is used for separating the at least one desired source signal from the additional mixing matrix. The type of processing may comprise at least one of PCA, non-stationary PCA, independent component analysis (ICA) and single value decomposition (SVD).

The method may further comprise determining a bit error rate in the at least one desired source signal after the decoding of the initial mixing matrix; and providing feedback via the transceiver to a transmitter transmitting the at least one desired source signal for adjusting encoding of the at least one desired source signal at the transmitter.

Another aspect of the present invention is to provide a communications device as defined above for decoding signals.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
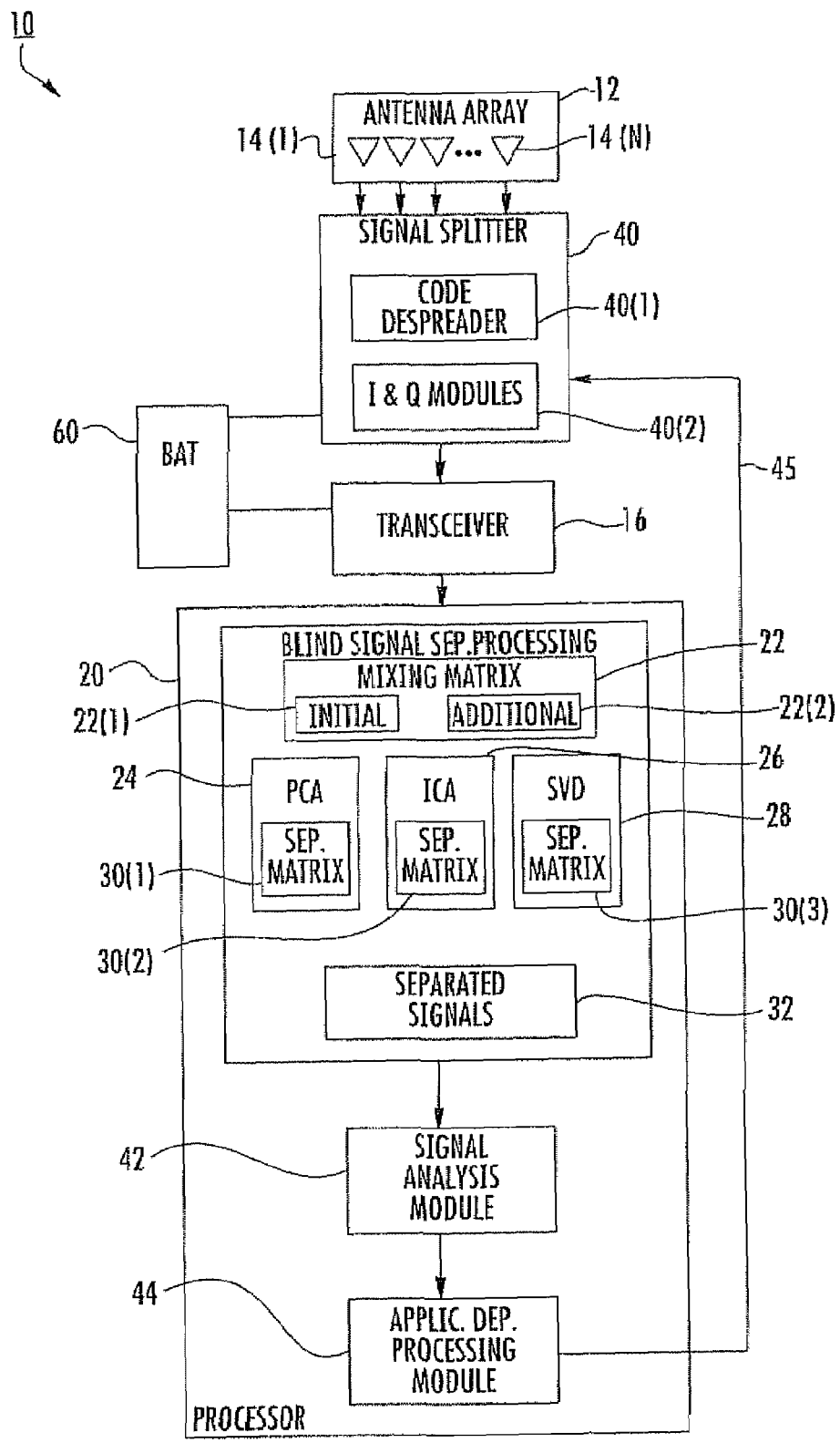
FIG. 1 is a block diagram of a communications device in accordance with the present invention.

A communications device 10 with adaptive decoding will now be discussed in reference to FIG. 1. An antenna array 12 receives a linear combination (mixture) of source signals from one or more signal sources. The signal sources typically provide desired signals, undesired signals and unknown noise sources.

The antenna array 12 comprises a plurality of antenna elements 14, with each antenna element receiving a different summation of the source signals. The antenna elements 14 include a first antenna element 14(1) through an Nth antenna element 14(N).

In one embodiment, the N antenna elements 14(1)-14(N) comprise N active antenna elements so that the antenna array 12 forms a phased array. In another embodiment, the N antenna elements 14(1)-14(N) may comprise at least one active antenna element, and up to N-1 passive antenna elements so that the antenna array 12 forms a switched beam antenna. In yet another embodiment, the antenna array 12 may comprise N active antenna elements, with at least 2 of the antenna elements having different polarizations.

The antenna elements 14 thus provide N ideally different summations of the source signals to a transceiver 16. However, not all the N different sums may be linearly independent, resulting in the number of useable linearly independent sums being less than N. A processor 20 is downstream to the transceiver 16. Even though the processor 20 is illustrated separate form the transceiver 16, the processor may be included within the transceiver. The different summations of the source signals received by the transceiver 16 are used to populate a mixing matrix 22. The mixing matrix 22 is then processed by one or more blind signal separation processing modules 24, 26 and 28 within the processor 20 to determine a separation matrix 30 for separating the source signals in the mixing matrix. The separated signals are represented by reference 32.

The separated signals 32 then undergo signal analysis by a signal analysis module 42 to determine which signals are of interest and which signals are interferers. An application dependent processing module 44 processes the signals output from the signal analysis module 42, which includes demodulating and decoding the signals provided thereto. The application dependent processing module 44 also determines what is the minimum rank of the mixing matrix 22 that is necessary for providing an adequate result when decoding the received summation signals.

The decision on which signals are of interest may not always involve the final signal to be decoded. For instance, the application may call for identifying interferers and subtracting them from the different summations of the received source signals, and then feeding the reduced signal to a waveform decoder. In this case, the signals of interest are the ones that ultimately end up being rejected.

A signal splitter 40 is coupled between the transceiver 16 and the processor 20. The signal splitter 40 is used to adaptively control the processing capability of the processor 20 by optimizing the size of the mixing matrix 22. This is accomplished by splitting the N different summations of the source signals. The illustrated signal splitter 40 comprises a code despreader 40(1) and in-phase (I) and quadrature (Q) modules 40(2).

To begin decoding signals in the communications device 10, source signals are received at the antenna array 12, with N different summations of the source signals being received since there are N antenna elements. The N different summations of the source signals are provided through the signal splitter 40 to the transceiver 16, without splitting the signals.

Next, the processor 20 evaluates the N different summations of the source signals by forming an initial mixing matrix 22(1) comprising the N different summations of the source signals. The initial mixing matrix 22(1) has a rank equal to N. The source signals are separated 32 from the initial mixing matrix 22(1). The separated signals 32 then undergo signal analysis by the signal analysis module 42 to determine which signals are of interest and which signals are interferers. The signals of interest are then demodulated and decoded in the application dependent processing module 44.

The processor 20 forms an additional mixing matrix 22(2) comprising the N different summations of the source signals. If the rank of the additional mixing matrix 22(2) is less than the minimum rank associated with the initial mixing matrix 22(1), then a feedback signal 45 is output by the application dependent processing module 44 to the signal splitter so that the source signals can be split for increasing the rank of the additional mixing matrix.

As an example, if the number of summation signals received by the antenna elements 14(1)-14(N) is N, where N=5, the row dimension of the initial mixing matrix 22(1) is also 5. However, if evaluation of the 5 different summations of the source signals indicates that one of the summations of the source signals is not linear independent, then the rank of the mixing matrix is 4, and therefore only 4 signals may be separated. If the desired signal is not in this separable set, then the rank of the mixing matrix needs to be increased by other means. The application dependent processing module 44 determines this situation, sets a higher minimum rank for the mixing matrix and instructs the mixing matrix creation processing to build such a matrix given the determined antenna array limitation(s).

A higher rank matrix is helpful for reducing the noise, which increases the signal-to-noise ratio of the desired signals, which in turn reduces the error rate. Reduced noise may be used to increase the transmit data rate, reduce the error correction encoding, or improve the overall reliability of the link. Also, shifting the burden of matrix filling to the receiver can also reduce the load on the transmitters, which can be exploited if there is a control loop between the two. Conversely, in some implementations the transmitter may be less resource constricted than the receiver and it can be instructed to perform adjustments which lowers the burden on the receiver.

The feedback signal 45 sent back to the signal splitter 40 indicates that the code despreader 40(1) is to be used for splitting the 4 different summations of the source signals of the antenna array usable element subset. To use the code despreader 40(1), the modulation of the source signals need to be spread spectrum signals, such as CDMA signals.

The code despreader 40(1) decodes the 4 different summations of the source signals, with each one of the 4 different summations including k codes for providing k different summations of the source signals associated therewith. If k=2, then the additional mixing matrix comprises 2*4 (i.e., kN) different summations of the source signals so that a rank of 8 is provided.

As an illustration, in case a rank of 8 was still less than the minimum rank associated with the initial mixing matrix 22(1), then the I and Q modules 40(2) separate each one of the 8 (i.e., kN) different summations of the source signals into I and Q component sets so that a rank of 16 (i.e., 2kN) is provided.

In lieu of using the code despreader 40(1) first, the I and Q modules 40(2) may be used first. Also, if the received signals are not spread spectrum signals or if only 1 code is used by the spread spectrum signals, i.e., k=1, then the code despreader 40(1) is not used.

The size of the initial mixing matrix 22(1) is either adequate, over-determined or under-determined. Over-determined means that the initial mixing matrix 22(1) is larger than what is necessary for decoding the received summation signals. Under-determined means that the initial mixing matrix 22(1) is too small for adequately decoding the received summation signals.

In both the over/under-determined cases, the processing capability of the processor 20 is not optimized. In the over-determined case, excess processing power is used, which in turn, consumes more electrical power. This is important when the communications device 10 is operating from a battery 60. In the under-determined case, processing is inadequate since the decoded signals may not be sufficient for use, i.e., the resulting bit error rate is too high.

If the rank of the additional mixing matrix 22(2) is greater than the minimum rank associated with the initial mixing matrix 22(1), then the source signals are modified so that the rank of the additional mixing matrix is decreased. The modifying comprises not including at least one of the N different summations of the source signals when forming the additional mixing matrix. This may also be a function of the signal splitter 40 based upon the feedback signal 45.

Referring back to the processor 20, the PCA module 24 operates based on the first and second moments of the different summations of the received source signals, whereas the ICA module 26 operates based on the third and fourth moments of the same signals. The SVD module 28 performs signal separation based on the eigenvalues of the different summations of the received source signals.

The correlation processing initially performed by the PCA module 24 determines an initial separation matrix 30(1) for the different summations of the source signals, and the ICA module 26 then determines an enhanced separation matrix 30(2) for separating the source signals in the mixing matrix 22. If the signals are separated by the SVD module 28, a separation matrix 30(3) is also determined for separating the different summations of the received source signals in the mixing matrix 22.

The processor 20 also determines if the N different summations of the source signals are stationary relative to the communications device 10. The processing for separating desired source signals from the additional mixing matrix 20(2) is based on principal component analysis (PCA) if the source signals are stationary, or non-stationary PCA if the source signals are not stationary.

The type of processing used for separating the desired source signals from the initial mixing matrix 22(1) is used for separating the desired source signals from the additional mixing matrix 22(2). The type of processing comprises at least one of principal component analysis (PCA), non-stationary PCA and independent component analysis (PCA).

As part of the application dependent processing module 44, a bit error rate in the desired source signals is determined after the decoding of the initial mixing matrix 22(1). Feedback is provided via the transceiver 16 to a transmitter transmitting the desired source signals for adjusting the encoding of the desired source signals at the transmitter.

The error correction encoding determines the error rates that can be tolerated in the raw decoded streams. Since the raw error rate is also a function of the subset of the matrix fill options, there is a tradeoff between these settings. A feedback and control loop between the encoder and decoder can be used to choose the optimum mutual settings. The encoding can be changed based on the stationary degree of the signal relative to the decoder.

The most robust operations require the additional mixing to be recalculated for every symbol. Often, however, the coherence time exceeds the number of symbols, such that measurements are only needed at a rate slightly faster than the coherence time. Reducing the additional mixing matrix determination occurrences will save power and processor overhead.

Monitoring the changes in the matrix from one occurrence to another is used to determine how often the decoding matrix must be recalculated. In wide band systems the subchannels often have individual coherence times. Each subchannel can have its own decoding matrix and associated measurement rate. This eliminates the need to recalculate one very large decoding matrix at the fastest necessary rate. In general the sum of measurements for the sub-decoding matrixes will be less than for the use of one large one.

Figure 2:
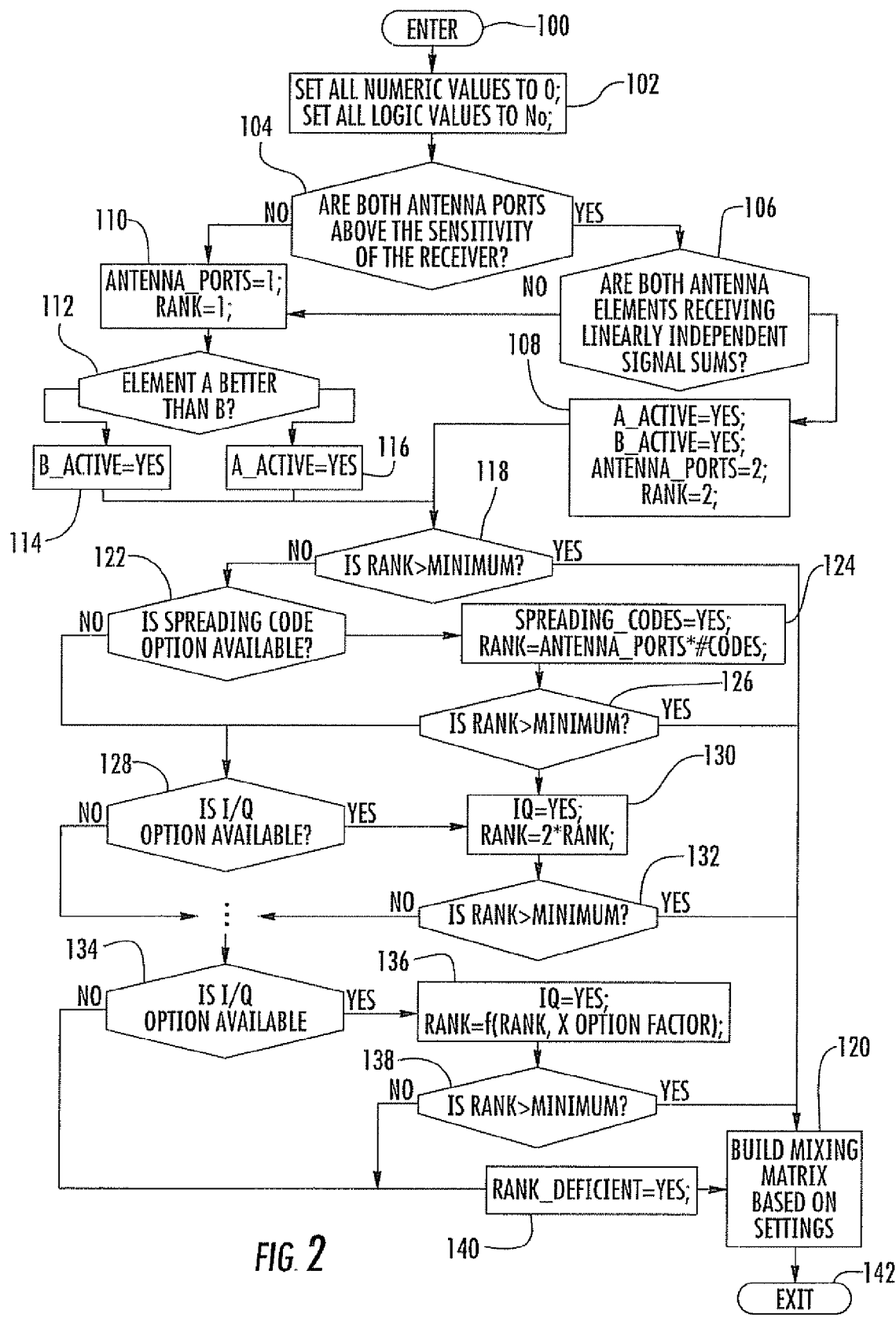
FIG. 2 is a detailed flowchart for creating a mixing matrix in accordance with the present invention.

Referring now to FIG. 2, a detailed flowchart for creating the mixing matrix 22 will now be discussed. For purposes of simplifying the illustration, the antenna array only comprises 2 antenna elements. From the start 100, all numeric values are set to 0, and all logic values are initialized at Block 102. An example logic value is the number of antenna elements 14 selected to provide summation signals to the transceiver 16. A determination is made at Block 104 as to whether both antenna ports are above the sensitivity of the transceiver 16.

If the decision to Block 104 is YES, then a decision is made at Block 106 for determining if both of the antenna elements are receiving linearly independent signal sums. If YES, the rank of the mixing matrix is set to 2 at Block 108.

If the decision to Block 104 had been NO, then the rank of the mixing matrix is set to 1 in Block 110. A decision is then made in Block 112 for determining if antenna A is better than antenna B. If YES, then antenna A is selected in Block 114. If NO, then antenna B is selected in Block 116.

In Block 118, a decision is made to see if the rank is greater than the minimum rank required for obtaining a useable result. The minimum rank is initially determined by evaluating the N different summations of the source signals as received by the antenna array 12. A mixing matrix 22 is formed comprising up to the N different summations of the source signals. In this case the rank equals 2. At least one desired source signal is separated from the mixing matrix 22. The at least one separated signal is decoded, and a decision is made concerning whether that current size of the mixing matrix is adequate, over-determined or undetermined based upon the at least one decoded signal.

If the decision in Block 118 is YES, then the mixing matrix is built based upon the current settings, as indicated by Block 120. If the decision in Block 118 is NO, then the flowchart steps through a sequence of steps for selecting a first option for increasing the rank of the mixing matrix, and if the first option is not sufficient for increasing the rank, then a next option is applied and so on up to an Xth available option.

For example, a decision is made in Block 122 with respect to spreading codes being available. If the source signals are spread spectrum type signals and more than 1 spreading code is used, then the rank is set to kN in Block 124. The new rank is compared to the minimum required rank in Block 126. If the decision in Block 126 is YES, then the mixing matrix 22 is built based upon the current settings, as indicated by Block 120.

If the decision in Block 126 is NO, then a decision is made in Block 128 with respect to I and Q modules being available. Each one of the kN signals is split into I and Q components so that the now becomes 2kN at Block 130. The new rank is compared to the minimum required rank in Block 132. If the decision in Block 132 is YES, then the mixing matrix 22 is built based upon the current settings, as indicated by Block 120.

If the decision in Block 132 is NO, then a decision is made in Block 134 with respect to another option being available. This option does not have to be another signal splitter option. Instead, the Nth option may address antenna techniques such as polarization, elevation and signal path selection techniques. As above, the new rank is compared to the minimum required rank in Block 136. If the decision in Block 136 is YES, then the mixing matrix 22 is built based upon the current settings, as indicated by Block 120. If no, then a rank deficient flag is set in Block 140 and the mixing matrix 22 is built anyway based upon the current settings, as indicated by Block 120. The flowchart exits at Block 142.

In general, the decoding matrix will not vary much from one calculation to the next. The prior values can therefore be used as seeds to provide an iterative determination of the solution, which will be less processor intense than determination from scratch. When the matrix is large to be begin with, iterative decoding will usually be faster even when the solution is determined from an unknown state. This is a well know method to solve large rank, fairly full matrices.

While a key means of separating the signals as outlined herein ICA, there are other methodologies such as subspace analysis and PCA. Due to the nature of the signals being decoded, the degree and type of interference, and the nature of the channels encountered by the various signals, one means of extracting the signals of interest versus suppressing the interfering signals may be of a superior nature for processing or power conservation. Analysis of the nature of the signals and the results obtained during prior decoding sessions will aid in determining the appropriate approach for a given decoding sessions.

Figure 3:
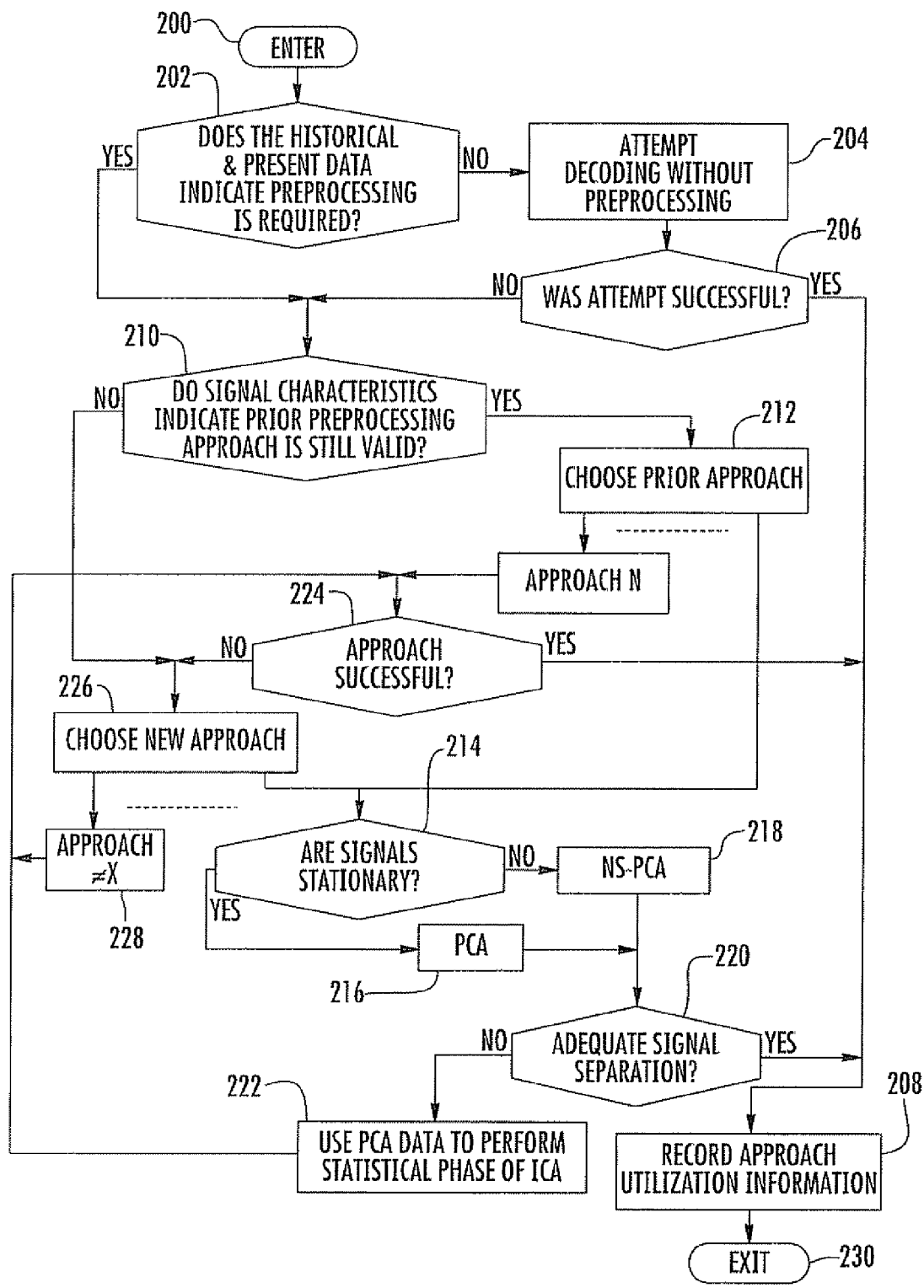
FIG. 3 is a flowchart for exploiting the mixing matrix created with the flowchart in FIG. 2.

A flow chart illustrating a particular decision tree and processing blocks that can be used to implement the blind signal separation processing is provided in FIG. 3. It can reduce processing and power loading, and choose an adequate processing approach while taking into account the stationary degree of the signal relative to the communications device 10. Of particular interest is ICA decoding, since in many implementations it is preceded by PCA decoding. The PCA coding in turn may be selected based on the stationary characteristics of the signals.

A flowchart for exploiting the mixing matrix created with the flowchart in FIG. 2 will now be discussed in FIG. 3. From the start (Block 200), a determination is made at Block 202 on whether or not the historical and present data indicate preprocessing is required on the mixing matrix. For instance, if the signal-to-noise ratio is high for the signals, then preprocessing is not required. If the decision is NO, the decoding is attempted without preprocessing in Block 204. A decision is made in Block 206 to determine if the decoding attempt is successful. If YES, then the signal separation approach is recorded in Block 208.

If the decoding attempt was not successful, then a decision is made in Block 210 concerning whether signal characteristics indicate a prior preprocessing approach is still valid. If YES, then the prior approach is chosen in Block 212. There are 1 to X approaches to choose from.

For the first approach, a decision is made in Block 214 concerning whether the signals are stationary. If YES, then PCA processing is performed in Block 216. The decision in Block 220 determines if adequate signal separation is obtained. If NO, then non-stationary PCA processing is performed in Block 218, and the decision in Block 220 determines if adequate signal separation is obtained. If the decision made in Block 220 is YES to indicate that the signal separation is successful, then the decoding approach is recorded in Block 208.

If the decision made in Block 220 is NO, then PCA data is used to perform a statistical phase of ICA in Block 222, and the path loops back to Block 224. If the signal separation approach in Block 224 is successful, then the approach is recorded in Block 208. If the signal separation approach in Block 224 is not successful, then another one of the N approaches is chosen in Block 226 and the steps through Blocks 214 through 220 are repeated. Block 228 insures that the same approach is not selected twice. The flowchart exits at Block 230.

Many variations on the logical flow are possible. For instance the only processing techniques available may be ICA and PCA optimized for non-stationary signals (NS-PCA). This would collapse the flow diagram to not using any preprocessing, preprocessing with only PCA, or utilizing the full ICA processing. It will be recognized by someone skilled in the art that variations on the general processing tree are still within the scope of this invention.

Whether or not the signals are stationary relative to the communications device 10 can be determined by a number of means. As previously mentioned, examination of the received signal summations can reveal the condition. If the communications device 10 is communicating principally with a fixed infrastructure and can determine or be told if it is moving, the signals may be classified as stationary or not dependant on the velocity of its movement. Another option would be for the other end of the communication link to tell the device the nature of its movement. This could be either because it knows its own movement, or has the ability to determine the other end's movement.

Since relative movement is the primary concern, a signal source moving relative to the reference plan in concert with the receive is stationary for in regards to signal reception. An example would be a train with an access point. A device communicating with it on the train would detect a stationary signal, while fixed infrastructure sources not on the train would be non-stationary.

Testing a number of different techniques may not always be practical, since time to do so may cause excessive delays (i.e., processing limitations), and the power consumed by attempting less powerful techniques unsuccessfully may exceed the power consumed by directly using the most robust technique. The use of ICA is particularly attractive since it can initially use PCA processing which when inadequate is not wasted, and the results are utilized in the full ICA processing.

In summary, the rank of the additional mixing matrix 22(2) determines the number of the most significant signals that will be separated, while the rest of the signals are treated as noise. This value therefore needs to be at a minimum inclusive of the signals to be decoded. A possibly higher minimum may be necessary to decrease the noise component so that the signal-to-noise ratio allows an acceptable decoding error rate. It should also be noted that dependent on the decoding methodology the signals being separated may not always include the ultimate signals of interest. For instance, removal of noise from the aggregate, and presentation of the cleaned-up aggregate to a classical decoder may be adequate.

If the options to fill the additional mixing matrix 22(2) exceed the rank necessary for operation, the signal splitter 40 can reduce the number of options being utilized. Some selections from the available set may be more desirable than others, and the optimum selection can allow for a lower matrix rank. This set can be determined by examination of the signals from the various options in comparison with the other options, by trial and error techniques (e.g., comparisons of results with each particular option used and not used), or by historical tracking of conditions and results. Examination of the received signals can also ascertain as to their stationary degree. Which method or combination of method used can also be determined based on effectiveness given known conditions and historical evidence.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A method for decoding signals in a communications device comprising an antenna array, a transceiver coupled to the antenna array, and a processor coupled to the transceiver, the method comprising;

receiving source signals at the antenna array, the antenna array comprising N antenna elements for receiving N different summations of the source signals;

providing the N different summations of the source signals to the transceiver;

evaluating the N different summations of the source signals in the processor by
forming an initial mixing matrix comprising the N different summations of the source signals, the initial mixing matrix having a rank equal to or less than N,
separating at least one desired source signal from the initial mixing matrix,
decoding the at least one desired source signal after the separating,
determining a minimum rank of the initial mixing matrix necessary for the at least one desired source signal to be useable after the decoding; and
forming an additional mixing matrix comprising the N different summations of the source signals, and if the rank of the additional mixing matrix is less than the minimum rank associated with the initial mixing matrix, then modifying the source signals so that the rank of the additional mixing matrix is increased.

2. A method according to claim 1 wherein the N different summations of the source signals used for the additional mixing matrix are the same as the N different summations of the source signals used for the initial mixing matrix, except time delayed.

3. A method according to claim 1 wherein the N different summations of the source signals used for the additional mixing matrix are different than the N different summations of the source signals used for the initial mixing matrix.

4. A method according to claim 1 wherein the communications device further comprises a signal splitter between the antenna array and the transceiver; and wherein the modifying comprises splitting the source signals so that the rank of the additional mixing matrix is increased.

5. A method according to claim 4 wherein the signal splitter comprises a code despreader for decoding the N different summations of the source signals, each one of the N different summations including k codes for providing k different summations of the source signals associated therewith, the additional mixing matrix comprising kN different summations of the source signals so that a rank of kN is provided.

6. A method according to claim 5 wherein the signal splitter further comprises in-phase (I) and quadrature (Q) modules downstream from the code despreader, and if the rank of kN is less than the minimum rank associated with the initial mixing matrix, then the I and Q modules separate each one of the kN different summations of the source signals into I and Q component sets so that a rank of 2kN is provided.

7. A method according to claim 6 wherein if the rank of 2kN is less than the minimum rank associated with the initial mixing matrix, then a rank deficient flag is set in the processor.

8. A method according to claim 4 wherein the signal splitter comprises in-phase (I) and quadrature (Q) modules for separating each one of the N different summations of the source signals into I and Q component sets, the additional mixing matrix comprising 2N different summations of the source signals so that a rank of 2N is provided.

9. A method according to claim 1 wherein if the rank of the additional mixing matrix is greater than the minimum rank associated with the initial mixing matrix, then modifying the source signals so that the rank of the additional mixing matrix is decreased.

10. A method according to claim 9 wherein the modifying comprises not including at least one of the N different summations of the source signals when forming the additional mixing matrix.

11. A method according to claim 1 wherein the N antenna elements comprise N active antenna elements so that the antenna array forms a phased array.

12. A method according to claim 1 wherein the N antenna elements comprise N active antenna elements, with at least two of the active antenna elements having different polarizations.

13. A method according to claim 1 wherein the N antenna elements comprise at least one active antenna element, and up to N−1 passive antenna elements so that the antenna array forms a switched beam antenna.

14. A method according to claim 1 wherein the processing for separating desired source signals from the additional mixing matrix is based on at least one of principal component analysis (PCA) and independent component analysis (ICA).

15. A method according to claim 1 wherein the processing for separating desired source signals from the additional mixing matrix is based on single value decomposition (SVD).

16. A method according to claim 1 further comprising determining if the N different summations of the source signals are stationary relative to the communications device; and wherein the processing for separating desired source signals from the additional mixing matrix is based on a stationary processing procedure if the received signals are stationary, or a non-stationary processing procedure if the received signals are not stationary.

17. A method according to claim 16 wherein the processing for separating the desired source signals from the additional mixing matrix is based on principal component analysis (PCA) if the source signals are stationary, or non-stationary PCA if the source signals are not stationary.

18. A method according to claim 1 wherein the type of processing used for separating the at least one desired source signal from the initial mixing matrix is used for separating the at least one desired source signal from the additional mixing matrix, the type of processing comprising at least one of principal component analysis (PCA), non-stationary PCA and independent component analysis (PCA).

19. A method according to claim 1 further comprising:
determining a bit error rate in the at least one desired source signal after the decoding of the initial mixing matrix; and
providing feedback via the transceiver to a transmitter transmitting the at least one desired source signal for adjusting the encoding of the at least one desired source signal at the transmitter.

20. A communications device comprising:
an antenna array for receiving source signals, said antenna array comprising N antenna elements for receiving N different summations of the source signals;
a transceiver coupled to said antenna array for receiving the N different summations of the source signals; and
a processor coupled to said transceiver for evaluating the N different summations of the source signals by
forming an initial mixing matrix comprising the N different summations of the source signals, the initial mixing matrix having a rank equal to or less than N,
separating at least one desired source signal from the initial mixing matrix,
decoding the at least one desired source signal after the separating,
determining a minimum rank of the initial mixing matrix necessary for the at least one desired source signal to be useable after the decoding; and said processor forming an additional mixing matrix comprising the N different summations of the source signals, and if the rank of the additional mixing matrix is less than the minimum rank associated with the initial mixing matrix, then modifying the source signals so that the rank of the additional mixing matrix is increased.

21. A communications device according to claim 20 wherein the N different summations of the source signals used for the additional mixing matrix are the same as the N different summations of the source signals used for the initial mixing matrix, except time delayed.

22. A communications device according to claim 20 wherein the N different summations of the source signals used for the additional mixing matrix are different than the N different summations of the source signals used for the initial mixing matrix.

23. A communications device according to claim 20 further comprises a signal splitter between said antenna array and said transceiver; and wherein the modifying comprises splitting the source signals so that the rank of the additional mixing matrix is increased.

24. A communications device according to claim 23 wherein said signal splitter comprises a code despreader for decoding the N different summations of the source signals, each one of the N different summations including k codes for providing k different summations of the source signals associated therewith, the additional mixing matrix comprising kN different summations of the source signals so that a rank of kN is provided.

25. A communications device according to claim 24 wherein said signal splitter further comprises in-phase (I) and quadrature (Q) modules downstream from said code despreader, and if the rank of kN is less than the minimum rank associated with the initial mixing matrix, then said I and Q modules separate each one of the kN different summations of the source signals into I and Q component sets so that a rank of 2kN is provided.

26. A communications device according to claim 25 wherein if the rank of 2kN is less than the minimum rank associated with the initial mixing matrix, then a rank deficient flag is set in said processor.

27. A communications device according to claim 23 wherein said signal splitter comprises in-phase (I) and quadrature (Q) modules for separating each one of the N different summations of the source signals into I and Q component sets, the additional mixing matrix comprising 2N different summations of the source signals so that a rank of 2N is provided.

28. A communications device according to claim 20 wherein if the rank of the additional mixing matrix is greater than the minimum rank associated with the initial mixing matrix, then the source signals are modified so that the rank of the additional mixing matrix is decreased.

29. A communications device according to claim 28 wherein the modifying comprises not including at least one of the N different summations of the source signals when forming the additional mixing matrix.

30. A communications device according to claim 20 wherein the N antenna elements comprise N active antenna elements so that said antenna array forms a phased array.

31. A communications device according to claim 20 wherein the N antenna elements comprise N active antenna elements, with at least 2 of the antenna elements having different polarizations.

32. A communications device according to claim 20 wherein the N antenna elements comprise at least one active antenna element, and up to N−1 passive antenna elements so that said antenna array forms a switched beam antenna.

33. A communications device according to claim 20 wherein the processing performed by said processor for separating desired source signals from the additional mixing matrix is based on at least one of principal component analysis (PCA) and independent component analysis (ICA).

34. A communications device according to claim 20 wherein the processing performed by said processor for separating desired source signals from the additional mixing matrix is based on single value decomposition (SVD).

35. A communications device according to claim 20 wherein said processor further determines if the N different summations of the source signals are stationary relative to said transceiver; and wherein the processing for separating desired source signals from the additional mixing matrix is based on a stationary processing procedure if the received signals are stationary, or a non-stationary processing procedure if the received signals are not stationary.

36. A communications device according to claim 35 wherein the processing performed by said processor for separating desired source signals from the additional mixing matrix is based principal component analysis (PCA) if the source signals are stationary, or non-stationary PCA if the source signals are not stationary.

37. A communications device according to claim 20 wherein the type of processing used by said processor for separating the at least one desired source signal from the initial mixing matrix is used for separating the at least one desired source signal from the additional mixing matrix, the type of processing comprising at least one of principal component analysis (PCA), non-stationary PCA and independent component analysis (PCA).

38. A communications device according to claim 20 wherein said processor determines a bit error rate in the at least one desired source signal after the decoding of the initial mixing matrix, and provides feedback via said transceiver to a transmitter transmitting the at least one desired source signal for adjusting the encoding of the at least one desired source signal at the transmitter.

* * * * *